April 1, 1952     O. O. NEWMAN     2,591,090
METERING PIN
Filed Feb. 12, 1947
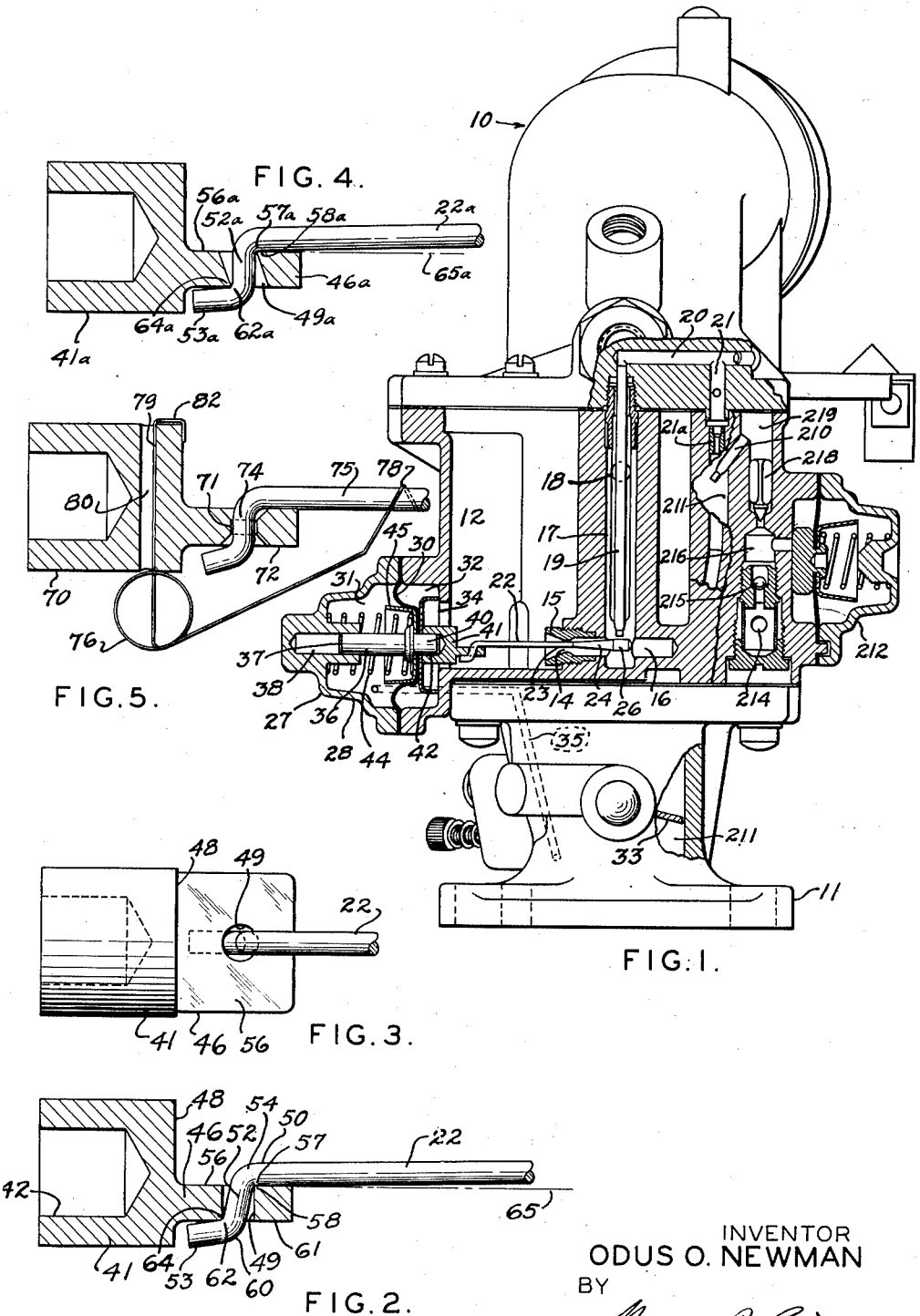
INVENTOR
ODUS O. NEWMAN
BY
George R. Ericoy
ATTORNEY Patented Apr. 1, 1952

2,591,090

UNITED STATES PATENT OFFICE 2,591,090

METERING PIN

Odus O. Newman, Normandy, Mo., assignor to Carter Carburetor Corporation, St. Louis, Mo., a corporation of Delaware Application February 12, 1947, Serial No. 727,962

1 Claim. (Cl. 138—46)

This invention relates in general to fuel mixing devices or carburetors, and has particular reference to improvements in the construction and operative assembly of a fuel metering valve for controlling fuel delivery to the carburetor mixing passage.

In a metering valve device of the character providing a metering jet and a control rod or valve having a tapered or stepped control portion operative through the jet orifice, it has been found that the amount of fuel drawn through the orifice in response to a given suction, will vary upon variations in the position of the metering rod with respect to the center of the jet orifice. On the other hand, the fuel flow will remain substantially constant for a given suction, so long as the metering rod is maintained stably in a definite position in the orifice. Patent No. 1,961,747, issued to William M. Ewart discloses a light spring constantly biasing the rod against a side of the orifice for this purpose. This patent also shows the metering rod attached to an operating lever by a separate pivot pin projected through an eye in the rod, with a retainer key, in the usual manner. Where the metering rod is carried by a vertically disposed, flexible diaphragm, mounted in a wall of the fuel bowl as shown, for instance, in Bicknell Patent No. 2,408,726 and Carlson et al. Patent No. 2,407,535, the mounting and assembling problem is complicated by the cantilever support and concealed positioning of the rod. For these reasons, the rod attachments in the above patents have not proven wholly satisfactory.

The principal object of the present invention is to provide simplified, yet effective means for attaching a metering rod to an actuating member, such as a diaphragm.

Another object is to provide a metering rod mounting which eliminates the use of separate assembly elements such as pivot pins, cotters and the like.

Still another object is to provide novel means to maintain the metering rod stably positioned in the jet orifice.

Other objects and advantages of the present invention as a whole and in respect to certain features thereof, will appear readily from the following description and accompanying drawing.

In the drawing:

Fig. 1 is a vertical elevation of a carburetor with parts thereof shown in section to illustrate the invention as applied thereto;

Fig. 2 is an enlarged detail view in side elevation, of a metering rod and rod operating member in assembly according to one embodiment of the invention, part of the operating member appearing in section;

Fig. 3 is a plan view of the rod assembly according to Fig. 2;

Fig. 4 is an enlarged detail side view and section of a modified form of metering rod and operating member assembly;

Fig. 5 is a view similar to Figs. 2 and 4, but showing another modification.

The present invention is shown applied to a metering valve device of an automatically operated type, wherein the longitudinal control position of the metering rod is determined by a suction operated diaphragm responsive to pressure conditions in the engine manifold. However, the same may be applied with equal facility, to metering valve arrangements of other types, as one wherein the metering element is subject to direct control by the throttle valve through an operative connection therewith.

Illustrated in Fig. 1 is a carburetor designated generally by the numeral 10, which may be of a conventional downdraft type providing a flange 11 at its lower end, for attachment to the manifold of an internal combustion engine (not shown). The carburetor structure includes a float chamber 12 in which fuel is maintained at a desired level, as by a conventional float-valve (not shown). Fuel is supplied from chamber 12 to the carburetor main nozzle (not shown) through a restricted orifice 14 in a jet element 15 preferably located in a lower or bottom zone of the supply chamber, and thence through delivery ducts or passages including a horizontal passage 16 adjacent the jet, an upwardly extending passage 17 and passage 18. The idling and low speed fuel supply is furnished through jet 15, tube 19, and ducts 20 and 21 leading to the usual idling port or ports (not shown). Duct 21 is provided with a flow controlling restriction 21a.

Acceleration fuel is supplied to an auxiliary nozzle 210 in the carburetor mixing passage 211, by a pump device including diaphragm 212. The pump draws fuel from the float chamber 12 through a port 214, past check valve 215 into pump chamber 216, and expels it past check valve 218 in the pump delivery passage 219 and auxiliary nozzle 210. The pump may be operated by a leverage connection to throttle 33, as in the above mentioned Bicknell patent.

Controlling fuel flow through jet orifice 14 is a metering rod 22 having its extremity projecting through the jet orifice. The rod control end is of differential or stepped form, providing a small diameter control step 23, an intermediate preferably tapering step 24, and a large diameter step 26. One or another of the metering steps is disposed in fuel metering cooperation with the jet orifice, by longitudinal displacement of the rod.

The metering rod is controlled by a suction device 27 which includes a casing 28 securing in position a flexible diaphragm 30, to provide a suction chamber 31 and pressure chamber 32 communicating with the float chamber through an opening 34. A passage 35 shown in phantom lines, connects the suction chamber 31 with the carburetor fuel passage 211 posterior to the throttle valve 33 therein, so that chamber 31 is subject at all times, to the suction conditions in the engine manifold. Centrally secured to and extending through diaphragm 30 is a plunger guide 36 having a portion 37 slidably received in casing bore 38, the forward end 40 of the plunger mounting by press fit a metering rod attachment member 41. Member 41 is operatively connected with the metering rod 22 in a novel manner presently to be described. Completing the suction device assembly is a suitable compression spring 44 bearing between the casing and the cup 45 secured with the diaphragm, the spring serving to bias the diaphragm assembly toward the discharged position shown in Fig. 1 in opposition to engine suction.

With particular reference now to Figs. 2 and 3 which illustrate one embodiment of the present invention, the metering rod actuating member 41 is formed to provide a generally rectangular lug 46 extending forwardly from the forward face 48 of the member rod having a central circular aperture 49. The end section 50 of the metering rod 22 is given a somewhat flattened S or crank shape as shown, providing the portion 52 turned laterally from the rod at a predetermined forward inclination, and the end terminal portion 53 extending forwardly from the portion 52. The diameter of lug opening 49 is greater by a predetermined extent, than the diameter of the rod at its crank end, so as to facilitate ready insertion of the crank end through the opening during assembly, and to position the rod crank end such that the crank portion 52 extends diagonally through the opening 49. Moreover, the size of the opening 49 and the angular relationship and dimensioning of the crank portions with respect to the diameter of the opening 49 and the thickness of the lug, are all preselected such that in the assembly, the portion 50 of the rod will be in supported contact with the lug at but two relatively spaced points. As is evident in Fig. 2, the first elbow-bend 54 of the rod crank, exposed on the face 56 of the lug, has the crook-point 57 thereof bearing against the underlying corner 58 of lug opening 49, while the second or terminal elbow-bend 60 of the crank, exposed on the opposite face 61 of the lug, has the crook-point 62 thereof in contact with the underlying corner 64 diagonally opposite to the corner 58. In consequence thereof, the metering rod 22 in free projection forwardly from the crank connection to the lug 46, will be in canted relation to the lug, and the axis 65 of the diaphragm as illustrated in solid lines in Fig. 2.

Referring again to Fig. 1, the suction device 27 is arranged on the carburetor with respect to the jet 15, so that in assembly the axes of the diaphragm and the jet are coextensive. Accordingly, it is necessary to deflect the metering rod laterally in order to permit final assembly of the suction device to the carburetor, with the metering rod extending into the jet orifice and the passage 16. The metering rod therefor is formed from a suitable material, as bar stock, providing a desired degree of resiliency permitting tensioning of the rod by lateral deflection thereof. Consequently, the final assembly of the metering valve and its suction actuator, the metering rod will be under a lateral tension sufficient to maintain the control end thereof stably in contact with one side of the orifices 15, as illustrated by Fig. 1. It is to be noted additionally, that the crank end of the metering rod is relatively free to turn or pivot in the lug opening 49, which thus facilitates self-adjustment of the rod to the jet.

From the foregoing with respect to the embodiment of the invention as illustrated by Figs. 1, 2 and 3, it will be now fully appreciated that the arrangement as described affords a novel, simple and positive supporting connection of the metering rod to its operating member, which is effected in a direct manner without requirement of separate connecting elements such as pivot pins, cotters and the like. Further, the arrangement including the two-point operative support of the metering rod crank end on the lug of the operating member, results in an operative positioning of the metering rod through the jet orifice, with the rod maintained in contact with one side of the orifice solely by the tensioned condition of the rod in its laterally deflected assembly position. Thus is obviated any necessity for a spring or otherwise separate biasing device, in order to hold the rod against one side of the orifice.

A modification of the embodiment of Fig. 2 is shown in Fig. 4, wherein corresponding parts are given the same reference numerals differentiated, however, by the letter suffix —a—. As there shown, the lug opening 49a is directed at an angle through the lug 46a, while the rod crank portion 52a is directed laterally of the rod so that its axis is substantially normal to the rod axis, and the crank terminal portion 53a has its axis substantially parallel with the rod axis. Similarly to the embodiment of Fig. 2, the size of the opening 49a and its inclination, together with the dimensions of the rod crank end 52a, are selected so that in the assembly the crank will bear at its crook-point 57a, on the margin 58a of the lug opening, and at its crook-point 62a, on the diagonally opposite opening margin 64a. Consequently, the rod 22a normally projects at an inclination to the plane of the lug face 56a, represented in edge view by the broken line 65a and is distorted in assembly with the jet. In all other respects, this embodiment is the same as that of Fig. 2, so that further description thereof is deemed unnecessary.

Fig. 5 illustrates a further embodiment of the invention, wherein the operating member 70 which is similar in general to the member 41 (Fig. 2), provides an aperture 71 in the lug 72 thereof, receiving the crank end 74 of the metering rod 75 in relatively free or unconstrained extension therethrough. Like the first described embodiments, this affords a simple yet positive operative connection of the metering rod and its actuating member, with one element of the two-part connection provided by an integral part of the metering rod. In operative assembly, the control end of the metering rod is not self-retained in contact with one side of the jet orifice, as in the primary embodiments, but is so held by a light spring 76 having a hook-end 78 seated against the metering rod. Spring 76 is carried on member 70 in tensioned condition, by projection of its opposite end 79 through a transverse passage 80 provided in member 70, with the terminal portion 82 hooked over the member, as shown.

It will be understood, of course, that the several embodiments of the invention, as herein shown and described, may be altered or modified without departing from the spirit and full intended scope of the invention as defined by the appended claim.

I claim:

In a carburetor provided with a liquid fuel supply passageway having a restricted orifice therein, a longitudinally movable metering rod having a control end portion movable through said restricted orifice for variably restricting fuel flow therethrough, said rod terminating at its opposite end in an S-shaped portion of substantially uniform diameter, and a metering rod operating member having a rod attaching lug with an opening therethrough of a diameter substantially greater than the diameter of said crank portion, said opening having its axis at a right angle to the direction of movement of said rod, and said rod crank portion having its intermediate transverse part disposed at a different angle to said direction and lodged between diagonally opposite marginal portions of said opening in the operative position of the rod wherein the control end portion thereof is in extension through said restricted orifice, such as to cause a lateral tensioning of the metering rod to a degree constraining the rod against one side of said orifice.

ODUS O. NEWMAN.

REFERENCES CITED

The following references are of record in the file of this patent:

UNITED STATES PATENTS

| Number | Name | Date |
| --- | --- | --- |
| 1,605,417 | Willoughby | Nov. 2, 1926 |
| 1,961,747 | Ewart | June 5, 1934 |
| 2,394,663 | Carlson et al. | Feb. 12, 1946 |
| 2,407,535 | Carlson et al. | Sept. 10, 1946 |